(12) United States Patent
Gordon

(10) Patent No.: US 6,170,242 B1
(45) Date of Patent: *Jan. 9, 2001

(54) LAWN MOWER HAVING INDEPENDENT DRIVE WHEEL SUSPENSION

(75) Inventor: Todd B. Gordon, Rome, NY (US)

(73) Assignee: Ferris Industries, Inc., Munnsville, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/119,818

(22) Filed: Jul. 21, 1998

Related U.S. Application Data

(60) Provisional application No. 60/053,403, filed on Jul. 22, 1997, and provisional application No. 60/063,362, filed on Oct. 28, 1997.

(51) Int. Cl.[7] .......................... A01D 34/03; A01D 34/43; A01D 34/64
(52) U.S. Cl. ..................................... 56/15.8; 280/124.141
(58) Field of Search ..................... 56/15.6, 15.7, 56/15.8, 16.7, DIG. 22, DIG. 3, DIG. 10; 280/124.179, 124.136, 124.141

(56) References Cited

U.S. PATENT DOCUMENTS

| | | | |
|---|---|---|---|
| 2,032,657 | | 3/1936 | Frederickson ................. 280/111 |
| 2,482,216 | * | 9/1949 | Rust ................................ 56/15.2 |
| 2,709,881 | * | 6/1955 | Goss ............................... 56/15.7 |
| 2,859,578 | * | 11/1958 | Hall ...................................... 56/6 |
| 3,024,041 | * | 3/1962 | Maruhn ..................... 280/124.109 |
| 3,159,959 | * | 12/1964 | Mathews ........................... 56/218 |
| 3,696,594 | * | 10/1972 | Freimuth et al. ................ 56/15.2 |
| 3,913,696 | * | 10/1975 | Kennedy et al. ................. 180/11 |
| 3,940,161 | * | 2/1976 | Allison ....................... 280/96.2 R |
| 4,159,613 | * | 7/1979 | Kundson et al. ................ 56/11.3 |
| 4,301,881 | * | 11/1981 | Griffin .............................. 180/6.48 |
| 4,787,646 | | 11/1988 | Kamlukin et al. ............. 280/95 R |
| 4,957,307 | * | 9/1990 | Gandiglio ......................... 280/666 |
| 5,129,218 | * | 7/1992 | Youngberg et al. .............. 56/15.8 |
| 5,197,755 | * | 3/1993 | Quick ............................... 280/690 |
| 5,305,588 | * | 4/1994 | Minato et al. ................... 56/10.2 |
| 5,355,664 | * | 10/1994 | Zenner ............................. 56/15.8 |
| 5,367,864 | * | 11/1994 | Ogasawara et al. ............ 56/15.8 |
| 5,435,591 | * | 7/1995 | Lee ................................... 280/673 |
| 5,507,138 | * | 4/1996 | Wright et al. ................... 56/14.7 |
| 5,765,858 | * | 6/1998 | Kawagoe et al. ............... 280/701 |

OTHER PUBLICATIONS

Simplicity Manufacturing, Inc. "The Guide to Simplicity Lawn & Garden Equipment" (1997) 11–12, 15–18, 20.
Ferris Industries "Ferris Commercial Mowers" (1998).

* cited by examiner

*Primary Examiner*—Thomas B. Will
*Assistant Examiner*—Árpád Fáb Kovács
(74) *Attorney, Agent, or Firm*—Michael Best & Friedrich LLP

(57) ABSTRACT

A lawn mower has drive wheels which are independently spring-suspended from the chassis. In one embodiment two rear wheels are independently driven for directional control, two front wheels are mounted at opposing ends of a center pivoting front axle, and the cutter deck is suspended between the front and rear wheels. In another embodiment the front wheels are drive wheels, the rear wheels are steerable, and the cutter deck is cantilevered from the front of the chassis. Wheel assemblies are attached to the chassis by a suspension system comprised of upper and lower link assemblies and a coil spring, preferably one in which the link assemblies are parallel and of equal length.

18 Claims, 8 Drawing Sheets

LAWN MOWER HAVING INDEPENDENT DRIVE WHEEL SUSPENSION

This application claims benefit of Provisional Patent Applications Ser. No. 60/053403, filed on Jul. 22, 1997, and 60/063,362, filed on Oct. 28, 1997.

TECHNICAL FIELD

The present invention relates to lawn and garden machines, in particular, to lawn mowers.

BACKGROUND

In a popular typical lawn mower design, the rider sits atop a four wheeled machine powered by an internal combustion engine. One or more blades swing about a vertical axis within a cutter deck attached to the machine, to cut grasses as the mower moves across a lawn or other turf.

The present invention is described here in terms of its application to a transmission-steerable commercial riding mower, for which it is especially useful. Such mowers are typically driven by independent hydraulic motors connected to the rear drive wheels. The front wheels are freely pivotable casters. Directional control, or steering, is obtained by differently varying the speed of the two rear wheels. It is consequently important that good traction be sustained between the rear wheels and the earth surface, especially when the mower traverses a slope, since gravity tends to pivot the front of the mower downhill. It is also important that any lawn mower maintain an evenness of grass cut. Cutter decks are typically either rigidly fixed to the underside of the mower, or they are suspended so they "float" —that is, they hang at a fixed elevation, but move upwardly upon contact with a rise in the soil surface.

Lawn mowers are generally intended for use on lawns and other surfaces which are level or gently undulating. Therefore, in most typical three and four wheel riding mowers heretofore, the wheels are directly fastened to the frame of the mower machine. However, then any vertical force or displacement on a wheel of the mower is transmitted directly to the frame (or chassis) of the machine. The frame of the mower will tilt and rise and fall according to the effects of one of the wheels. So, under certain conditions the chassis vertical motion will undesirably change the elevation of the cutter deck with respect to the lawn being cut. Another undesirable effect of lifting or tilting of the mower chassis is loss of wheel traction which is critically important in transmission steerable machines. And, undue bumpy up and down motion is discomforting to the operator.

For mowers intended for use on rougher terrains, designs have been employed which seek to mitigate the adverse effects of undulations. Among such are front and rear wheel axles which tilt about a center pivot. But, in machines with a center pivot axle, when a wheel rises, the center pivot point and the whole end of the frame necessarily also rise, albeit to a lesser degree than when the wheel is fastened directly to a frame. Therefore, there is a continuing need for further improvements in suspension systems in self-propelled lawn mowers.

SUMMARY

An object of the invention is to provide lawn mowers with drive wheel and suspension system combinations which minimize unwanted motion of the mower chassis due to turning and to traversing bumps and uneveness. Another object of the invention is to improve the constancy of contact of mower drive wheels with the surface of the earth, when a mower traverses undulating surfaces, particularly in transmission-steered mowers.

In accordance with the present invention a lawn mower has a cutter deck, a prime mover, one or more wheels at one end of the mower chassis, and a pair of drive wheels at the other chassis end powered by the prime mover. Each drive wheel is part of a drive wheel assembly, attached to either side of the chassis by suspension means which comprise a spring. The suspension means enables each drive wheel to move vertically up and down, respectively with and against force exerted by the spring, independently of the movement of the opposing drive wheel. In the generality of the invention, either the front wheels or rear wheels of a mower may be the driven wheels. In one embodiment, the mower has two front wheels and two rear wheels and the cutter deck hangs between them; each rear drive wheel is part of an assembly comprising a motor independently driven by the prime mover, and the mower is steered by varying the relative speed of the opposing drive wheels. In another embodiment, the four wheel mower has front drive wheels and conventional steerable rear wheels; and, the cutter deck is cantilevered from the front end of the machine.

In further accord with the invention, the suspension means for a mower is comprised of upper and lower link assemblies which are pivotably mounted at inner ends to the chassis and at the outer ends to the wheel assembly. In one embodiment, the lengths of the upper links and the lower links are equal, and run parallel. In another embodiment, the links are not parallel, and the lower links are longer than the upper links, preferably to an extent which makes the roll center of the machine lie at the same elevation from the earth surface as the center of gravity of the machine. In another embodiment, the spring of the suspension system is compressed when the machine is static, to thereby lessen the change in elevation of the chassis due to the operator mounting and dismounting the machine. In another aspect of the invention, each spring-suspended wheel assembly is connected to a nearby portion of the deck, so when a wheel moves upwardly against the spring, the deck portion is correspondingly lifted from its basic position.

The invention reduces the amount of vertical motion of the chassis, for example when the mower traverses uneven ground and one or both drive wheels rise or fall. As a result there is less vertical motion induced into the cutter deck. There is better contact of the drive wheels with the surface when traversing undulations, for transmission steerable machines directional control of under adverse conditions is improved.

The foregoing and other objects, features and advantages of the invention will become more apparent from the following description of the best mode of the invention and accompanying drawings.

DESCRIPTION

Figure 1:
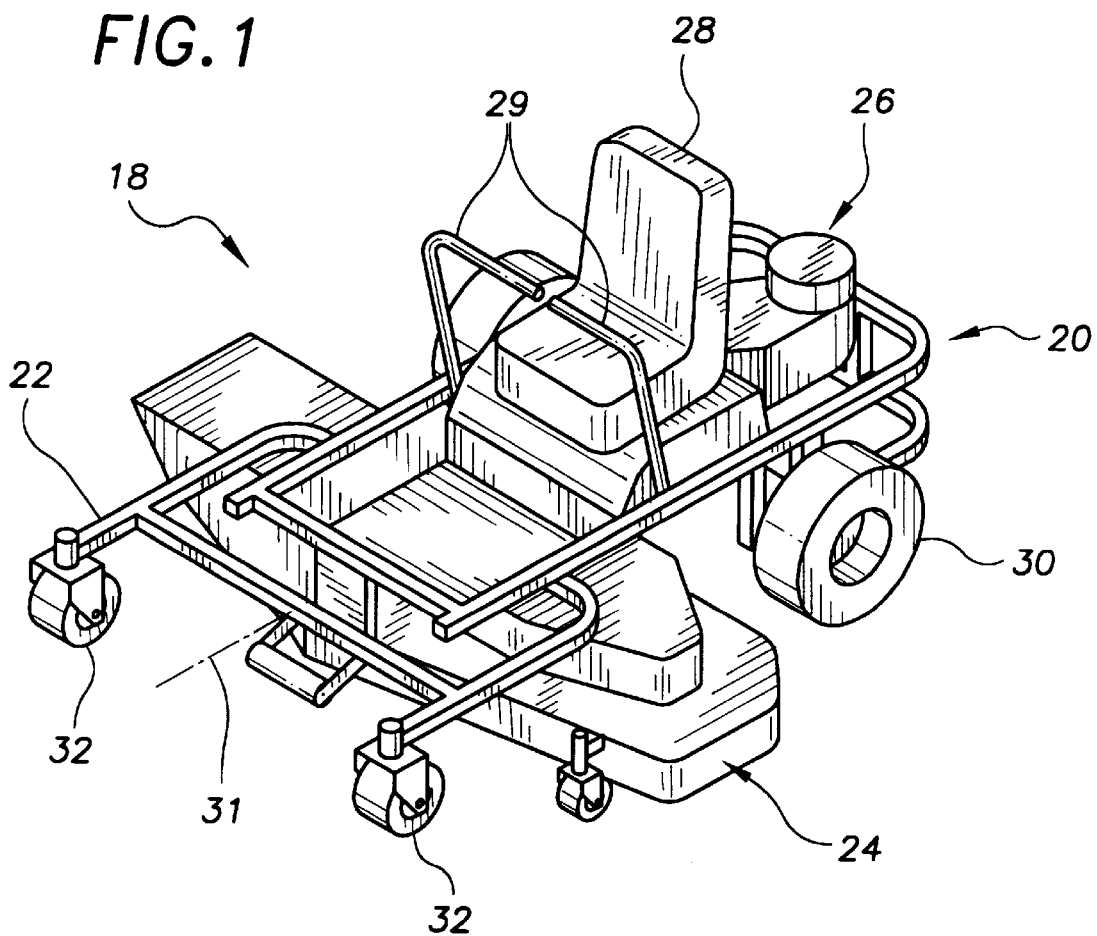
FIG. 1 is a perspective view of a four wheel transmission steerable lawn mower.
Figure 2:
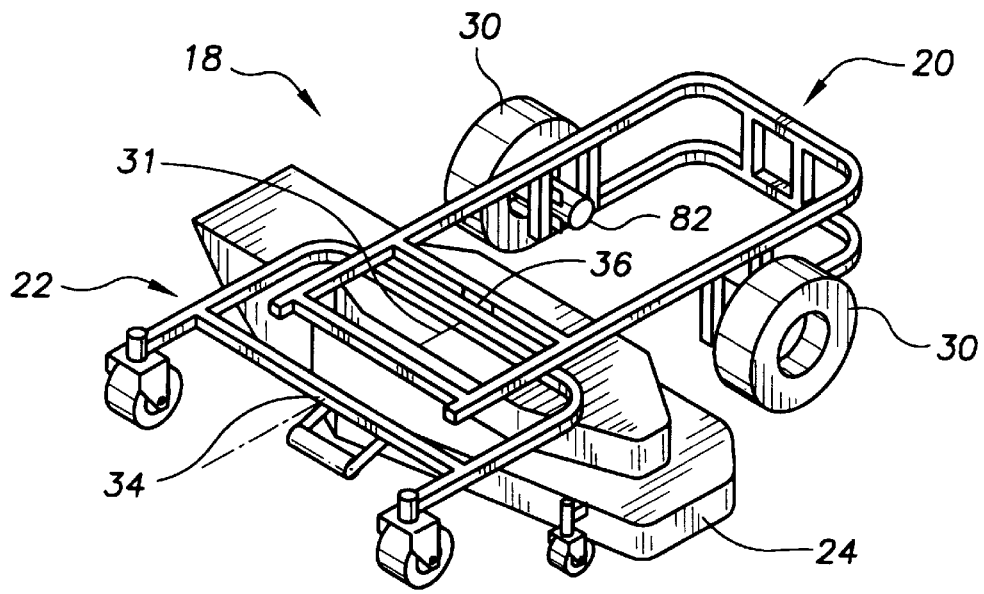
FIG. 2 is a skeletal view of the mower of FIG. 1, showing the chassis and front wheel subframe.

The invention is described in terms of its application to a 4-wheel transmission steerable mowing machine. FIG. 1 semi-schematically shows a riding lawn mower 18. FIG. 2 shows the same mower with certain parts removed, to expose the chassis configuration. The mower is comprised of a chassis 20 which carries a prime mover 26, an operator seat 28, and a cutter deck 24. The prime mover is a combination of gasoline internal combustion engine coupled to a hydraulic pump. Fluid from the pump is piped to the separate hydraulic motors which turn each rear wheel. Other prime movers may be substituted. The mower operator sits on the operator seat 28, atop the chassis and just forward of the engine and pump. Fuel tanks are concealed beneath the driver seat.

Rear drive wheels 30 are mounted on opposing sides of the rear end of the chassis, by a suspension system described below. Each rear wheel is independently rotated in forward or reverse by a hydraulic motor powered by the hydraulic pump. Manipulation of control arms 29 varies the hydraulic fluid flow to each motor. The operator obtains directional control, or steering, of the mower by varying the relative speed of the two rear wheels.

The front end of the chassis is comprised of a subframe (or subchassis) 22 attached at two spaced apart pivot points 34, 36. The subframe pivots about a longitudinal centerline 31 of the mower. Two free-pivoting front caster wheels 32 are attached on opposing sides of the front end of the subframe. The pivoting subframe is described in U.S. Pat. No. 6,062,333 filed Jul. 23, 1997, "Riding Mower with Pivoting Front Wheel Assembly", having common inventor and assignee herewith. The portions of that application's Description which relate to FIG. 1–7 thereof, and the Figures, are hereby incorporated by reference. The subframe gives better strength than the prior art single-beam, single mounting point, pivoting axle. A pivoting axle, mounted on the chassis at point 34, may alternately be used. Stated generally, the preferred front end structure of the chassis comprises a pivoting transverse member at the ends of which are mounted wheels. The pivoting front axle or subframe minimizes twisting and lifting of one side of the chassis which otherwise would occur when one front wheel rises or falls. A pivoting front end reduces the degree to which the chassis is lifted or twisted, with a tendency for lifting a rear drive wheel from the earth surface, and thus it cooperates with the within described rear wheel suspension system in fulfilling the objects of the invention. Notwithstanding, much less preferably, the front axle may be rigidly attached to the chassis in use of the invention.

The cutter deck 24 is mounted beneath the chassis between the front and rear wheels of the mower. The cutter deck comprises a housing within which one or more cutter blades rotate in a horizontal plane, about vertical axes. The cutter deck shown is a floating deck. That is, it is suspended by adjustable length chains or other hangers which limit the downward motion of the deck, yet allow the deck to move vertically, such as when the wheels or other parts on the underside of the deck encounter a rise in the earth surface during mowing.

The chassis 20 is made of square steel tubing. The rear end of the chassis is comprised of a U-shaped upper member 37 and a like lower member 38. Struts connect the upper and lower members. Most particularly there are struts 40 where the rear wheel assemblies are suspended from the chassis. See FIG. 4.

Figure 3:
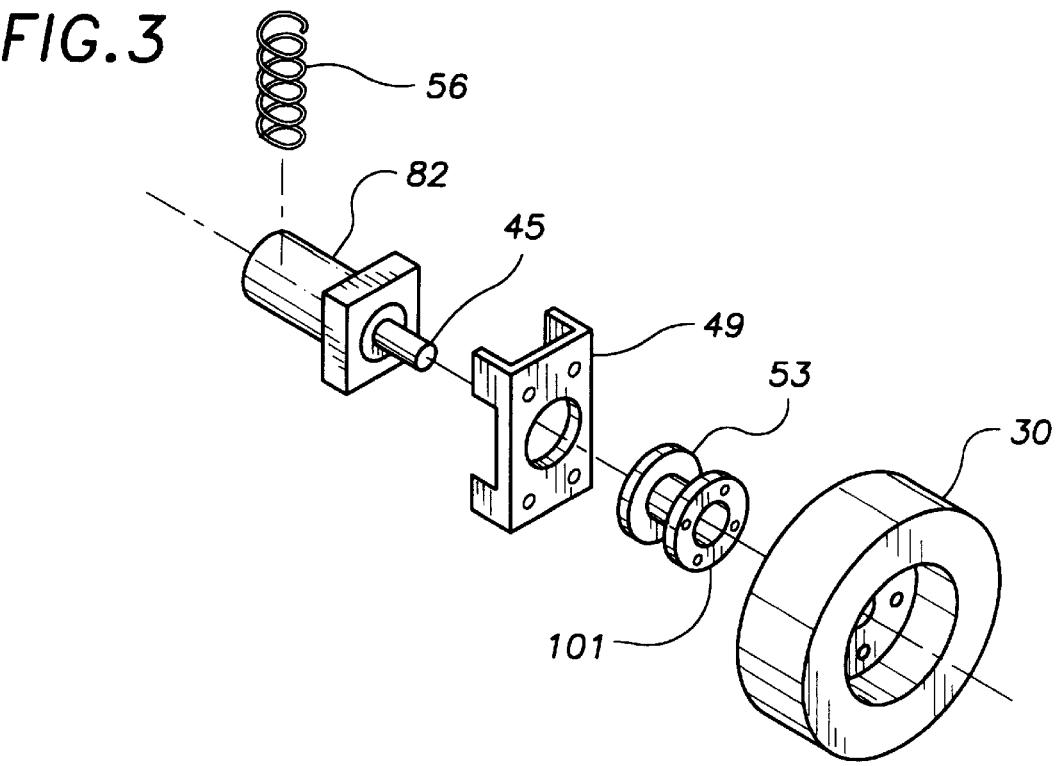
FIG. 3 is an exploded view of a wheel assembly.

Each rear wheel is part of a wheel assembly which is connected to the chassis by a suspension system. The exploded view of FIG. 3 shows components of the wheel assembly, namely motor 82 which bolts to motor mount 49, hub 101 which mounts on the shaft 45 of the motor, wheel 30 which bolts onto hub 101, and spring 56 which bears on the motor. An unshown fitting is attached to the motor casing to locate the bottom end of the spring.

Figure 4:
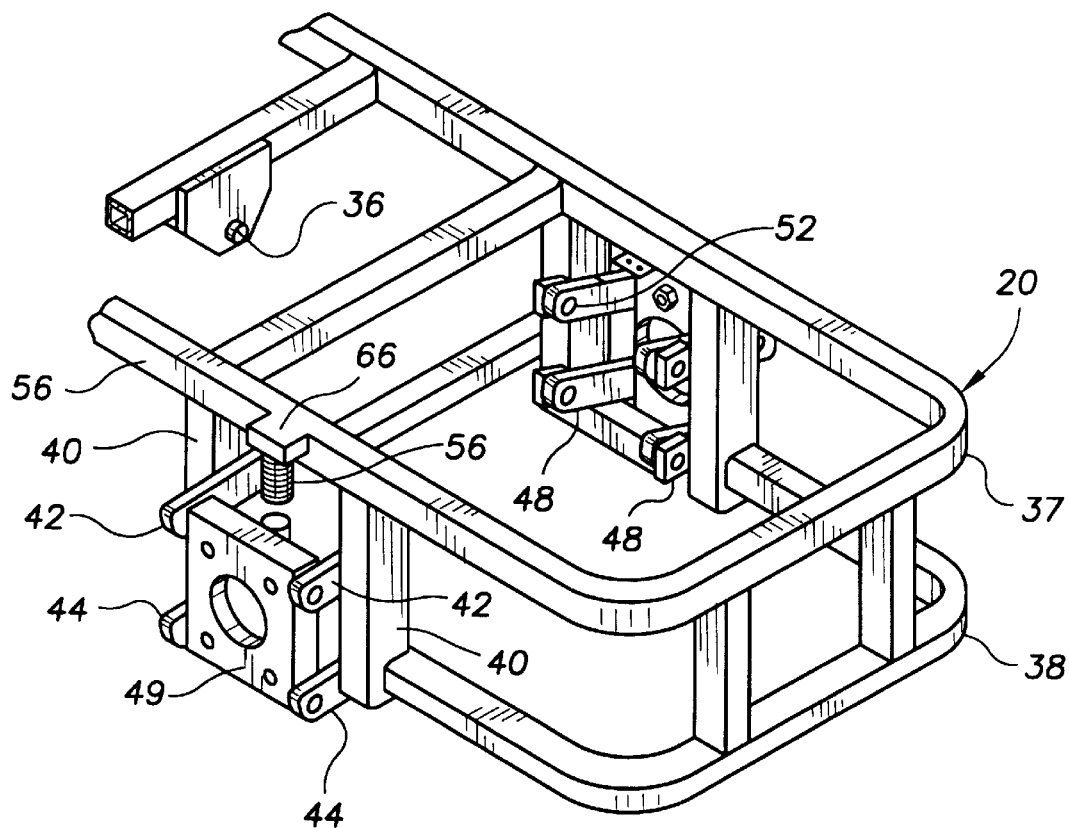
FIG. 4 shows the rear part of a chassis, a left-side suspension system comprised of equal length upper and lower link pairs and a coil spring, and the motor mount of a wheel assembly.
Figure 5:
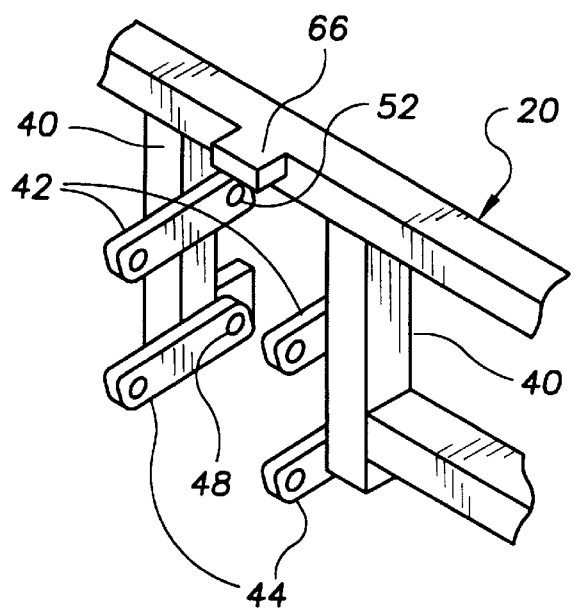
FIG. 5 is a view of some of the components shown in FIG. 4.

Parts of the rear end of the mower and a preferred suspension system are shown in FIG. 4. The left side of the mower is typical of the right side. Reference should also be made to FIG. 5–7 and 12. The preferred suspension system is comprised of an upper link assembly and a lower link assembly and a coil compression spring. The upper assembly comprises a pair of links 42, and the lower assembly comprises a pair of links 44, all pivotably mounted at their inner ends off struts 40 at respective pivot points 52, 48. Each upper set of links 42 and lower set of links 44 run parallel, outwardly and downwardly, from the chassis, to pivotably connect respectively to the top and bottom of motor mount 49.

The motor mount of the wheel assembly, and thus the wheel assembly as a whole, is pivot pin-connected to the suspension system, as shown. Each suspension system also comprises a wire coil spring 56 which exerts a downward vertical force on the motor, and thus the wheel assembly, by virtue of being captured between the motor 82 and the spring bracket 66 which is joined to the upper member of the chassis. See FIGS. 4 and 12. Thus, a static or dynamic load applied to a rear corner of the chassis will compress the spring, and cause the links and wheel assembly at the corner to move upwardly relative to the chassis. A lesser load, as when a wheel crosses a depression in the earth surface, results in opposite effects. While a steel wire coil compression spring is preferred, other resilient-acting devices may be used in substitution, including other types of metal and non-metal springs, pneumatic springs or air cushions, etc. In the claimed invention, the term "spring" is intended to comprehend such generality of devices.

Figure 7:
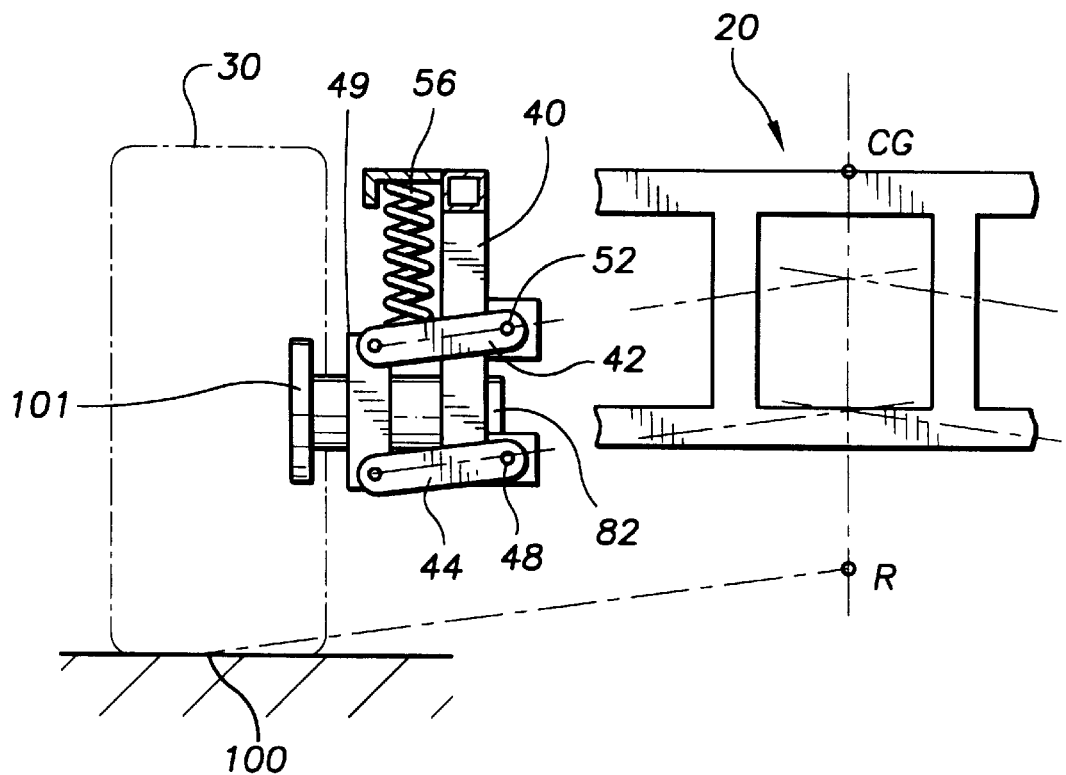
FIG. 7 is an elevation view from the rear end of a chassis where a suspension system has equal length upper and lower links, and shows the relation between the roll center and the center of gravity.

In one suspension system configuration, shown in FIG. 7, the upper and lower links are of equal length. (A reference herein to the length of a link is a reference to the length between the pivot point connections of the links.) FIG. 7 is a fragmentary partial-cutaway elevation view of the rear end of the chassis, suspension system, and wheel assembly. The wheel is shown in phantom cross section. The Figure illustrates how the elevation of the roll center R which is characteristic of the rear suspension system relates to elevation of the center of gravity (or mass) CG of the whole machine, for the equal-length link suspension. In a typical commercial transmission steered mower, the center of gravity will be about 20 inches off the surface of the earth, varying with the fuel and operator weight. In the FIG. 7 configuration of suspension, the roll center is significantly lower in elevation than the center of gravity. A roll center is an imaginary point about which a mower with movable suspension system elements tends to roll, when subjected to lateral forces. The roll axis of the mower runs through the roll centers of the front and rear suspension systems. How the roll center is determined is briefly described just below.

Figure 8:
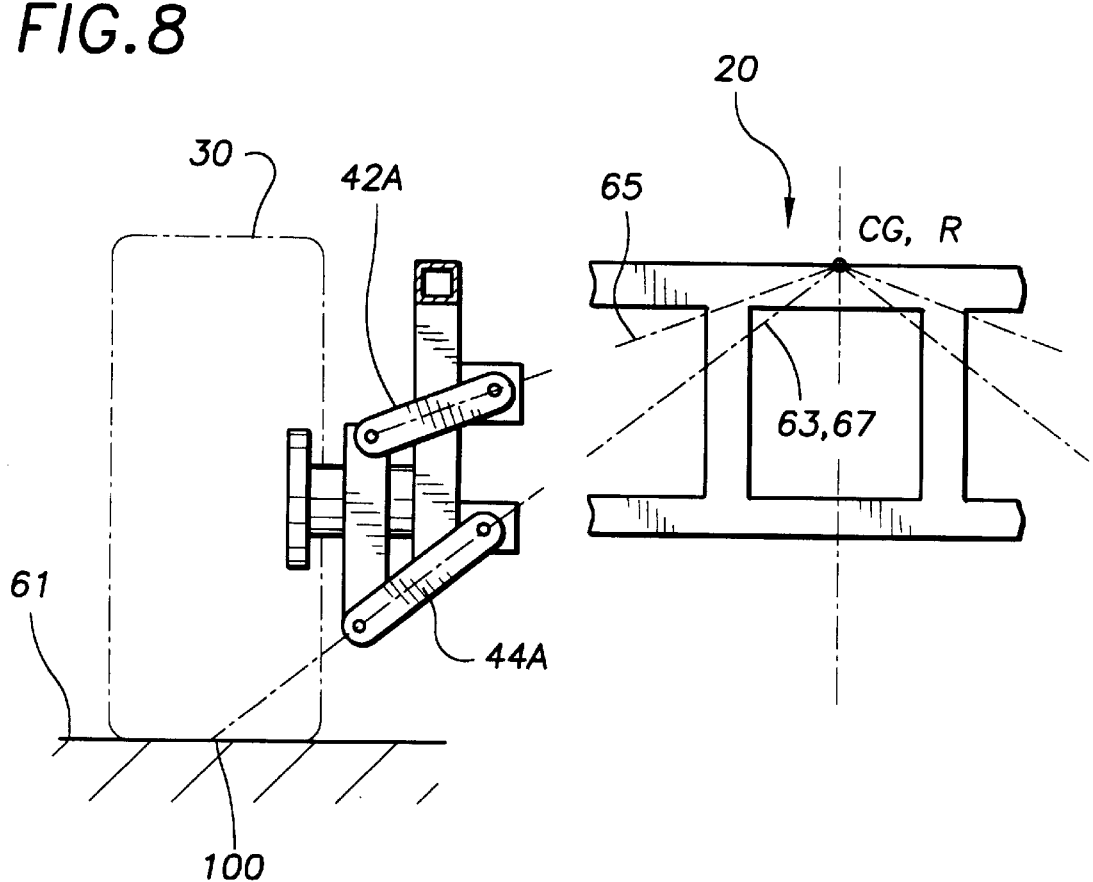
FIG. 8 is a view like FIG. 7, showing a suspension system where the lower link pair length is greater than the upper link pair length, and where the roll center is at substantially the same elevation as the center of gravity.

Another suspension embodiment is shown in FIG. 8 which is analogous to FIG. 7. The upper links 42A are unequal in length to the lower links 44A; and, the links are of such dimension and orientation, that the roll axis R substantially coincides in elevation with the center of gravity CG. This configuration produces minimal tendency for the vehicle to roll during turns. Roll center R is at the intersection of the lower phantom line 63 and the upper phantom line 65. Line 65 runs through the pivot points of the upper links. Line 63 runs through the lower link pivot points. Line 67 runs from the center of ground contact 100 which the wheel 30 makes with the surface of the earth 61 to the convergence point of the lines 63, 65. (In FIG. 7, for parallel links, such point is at infinity.) Where the line 67 crosses the vertical mid-plane CP of the system is the roll center. Thus, when mowing and turning, a mower with FIG. 8 suspension will rock little; and, the mower deck will be kept essentially horizontal and at constant elevation with respect to the surface being mowed. While making the roll center and the center of gravity substantially coincide in elevation is in one sense the optimal design, other less optimal choices of unequal length links will be found useful.

Reference is made again to the equal link length suspension assembly shown in FIG. 7. The equal-length configuration provides a less desirable relationship of roll center to center of gravity, in that the roll center R is significantly below the center of gravity CG. This means that the vehicle can tend to sway or rock to the side when turning. Sway bars, also called anti-sway and anti-roll bars, are optionally added to the equal length suspension to inhibit swaying of the mower in turns. Typically, such bars are torsion bars or other elastic structures which, when one wheel moves closer to the chassis, resist such motion with a force—the reaction to which is applied to the opposing wheel. Notwithstanding its disadvantageous tendency to roll, the FIG. 7 equal-length link suspension system provides better vehicle ride and absorption of bumps, compared to the unequal link suspension. It also minimizes the lateral motion of the wheels when the load changes, as when an operator mounts and dismounts the mower, or when there is a change in vertical momentum of the mower and operator due to the mower traversing uneven ground. In the FIG. 7 embodiment, the parallelogram form of the upper link, strut, lower link, and motor mount, means a wheel moves vertically without change in camber.

Figure 11:
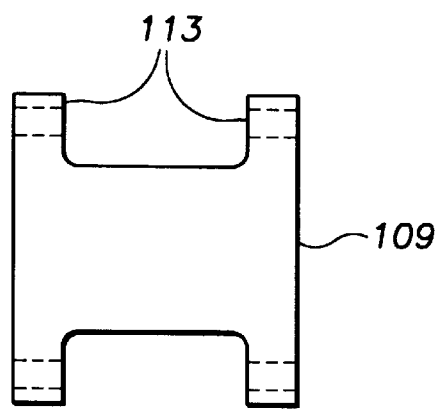
FIG. 11 shows a plan view of a one piece link.
Figure 12:
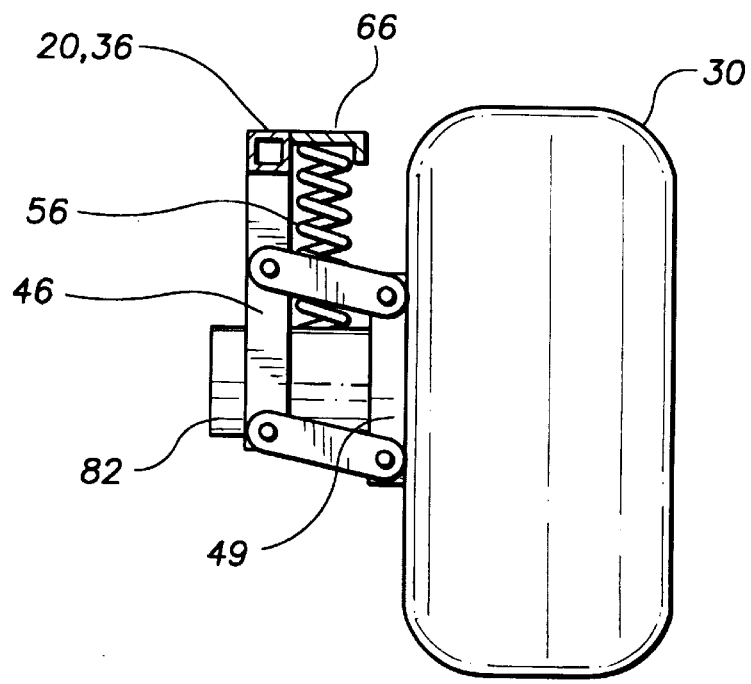
FIG. 12 is an elevation view of a portion of the chassis, the suspension, and the wheel assembly.

It is preferred to use a pair of links to make the upper and lower link assemblies, as have been described, inasmuch as such is an efficient design to accomodate the coil spring and motor. But, other connecting structures which achieve the same purpose may be used. For instance, as shown in FIG. 11, a link assembly may be comprised of a solid link member 109 with four journals 113, for mounting on pins at pivot points. The term link assembly should thus be understood to comprehend a one piece upper or lower link, multiple upper and lower links, and other structures which function in a manner similar to those described in the preferred link assembly embodiment.

Figure 6:
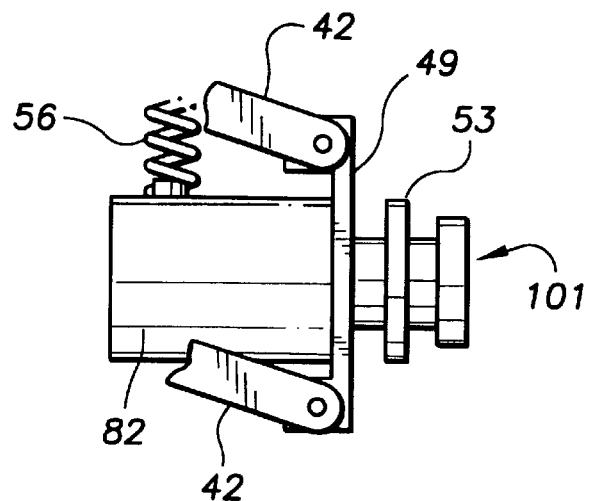
FIG. 6 shows details of the motor and hub of a wheel assembly, and their connection to the suspension system.

With the improved suspension system described herein, it is preferable that a disk brake system be used for parking, compared to band-drum type brakes familiar in many prior art machines. Thus, a disk 53 may be provided on the hub, as illustrated by FIG. 6 and 3. Brake calipers containing friction pads, are fastened to the stationary parts of the wheel assembly, to frictionally engage the disk when actuated by cables running to the operator's location.

Figure 10:
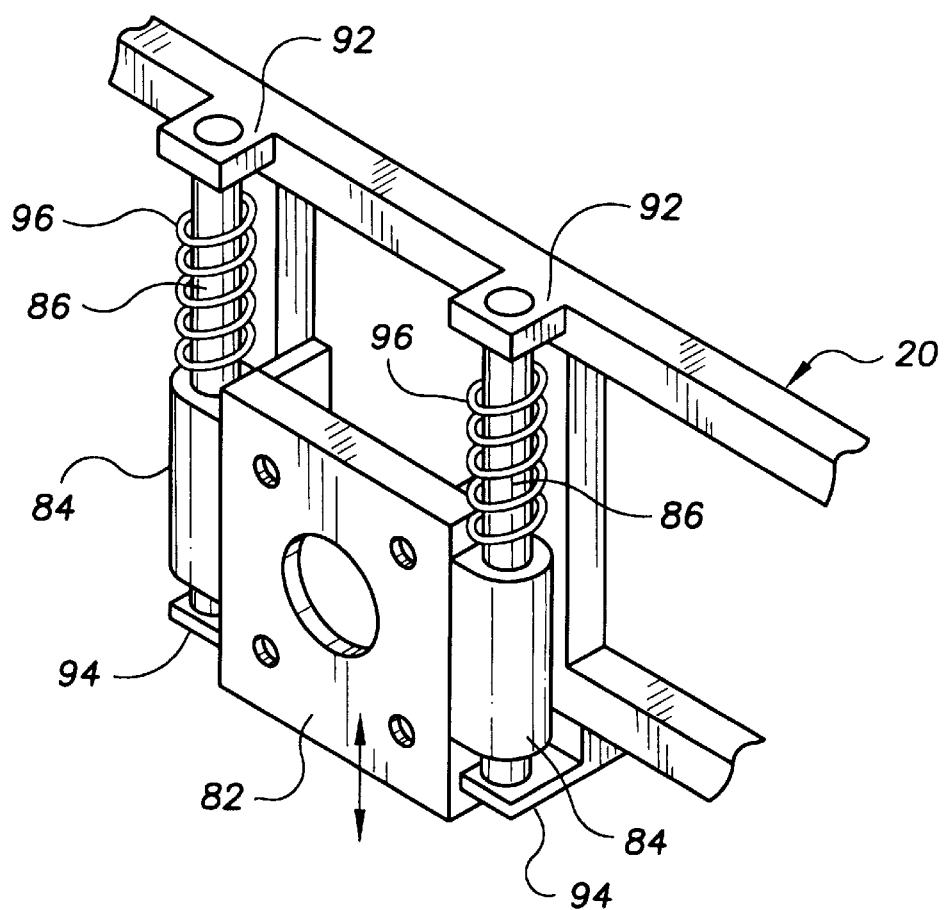
FIG. 10 is a view like that of FIG. 5, showing an alternate embodiment suspension system comprising two struts which support a journaled motor mount.

FIG. 10 shows an alternate embodiment of independent rear suspension system where vertical motion is obtained by having the motor block slide up and down on guides. In this embodiment, the motor mount 82 has two opposing journals 84 which are slidably mounted on spaced apart parallel cylindrical struts 86. The struts 86 are fixedly mounted on the chassis 20 by mounting brackets 92, 94. Circumscribing the struts 86 are wire coil springs 96. Thus, in use, the mower chassis is supported by the coil springs pressing against the motor mount. Other sliding motion mechanisms can be substituted for the struts and motor block journals. It will be evident that only a single strut of sufficient strength could be used for each wheel. In the FIG. 10 construction there is no lateral motion and no camber of the wheel when it moves up and down. Other independent suspension mechanisms may be also used in practice of the invention, including mechanisms which combine springs, shock absorber and strut into one unit, such as the so-called MacPherson strut.

Referring again to the preferred single wire coil compression spring and equal length link suspension system of FIG. 4, one typical lawn mower will have a spring with a spring rate of about 500 lb per inch. Preferably, when the links are at their furthest point of downward rotation, the force on the spring will be zero; and the suspension system design enables about 3.5 inch compression of the spring. When the mower is idle with an operator seated on the operator seat, the compression of the spring will be about 1.0 inch. Thus, when subjected to dynamic loads during use, the suspension system enables a wheel to travel about 30% of its total vertical displacement downwardly (i.e., corresponding to release of the 1.0 inch of total 3.5 inch spring compression) and about 70% upwardly.

Figure 9:
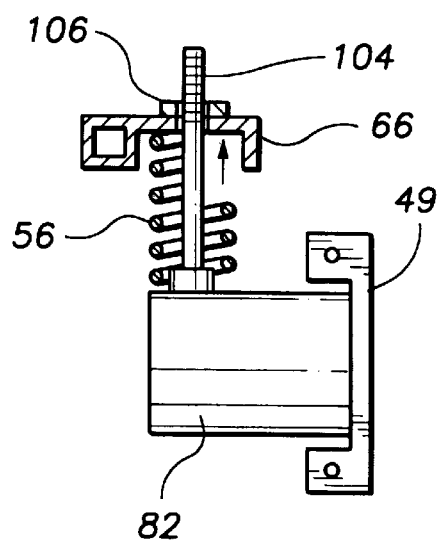
FIG. 9 is view like FIG. 6, showing a partial section elevation view of a motor, coil spring, and rod and nut combination, for providing a pre-compression to the spring.

The weight of the operator of the vehicle, and thus in large measure the weight supported by the rear wheels, may vary by one hundred or more pounds. Thus, in an alternative embodiment, means are provided for pre-compressing the suspension spring, to thereby lessen the change in elevation of the chassis due to an operator mounting and dismounting the mower. Referring to FIG. 9, the pre-compression may be accomplished by pivotably attaching a threaded guide rod 104 to the motor. The rod runs through a hole in bracket 66 and is able to move upwardly when the motor 82 moves up during use. A nut 106 on the rod is used to draw the rod through the bracket, thereby compressing the spring 56. Thus, unless the load applied to the wheel exceeds the force of pre-compression there will be no motion of the motor and wheel assembly relative to the chassis. Appropriate pre-compression for a load slightly less than the operator, will mean that there is little vertical motion as the operator mounts and dismounts. But during mowing, the wheel will tend to respond as it would in the absence of pre-compression.

Figure 13:
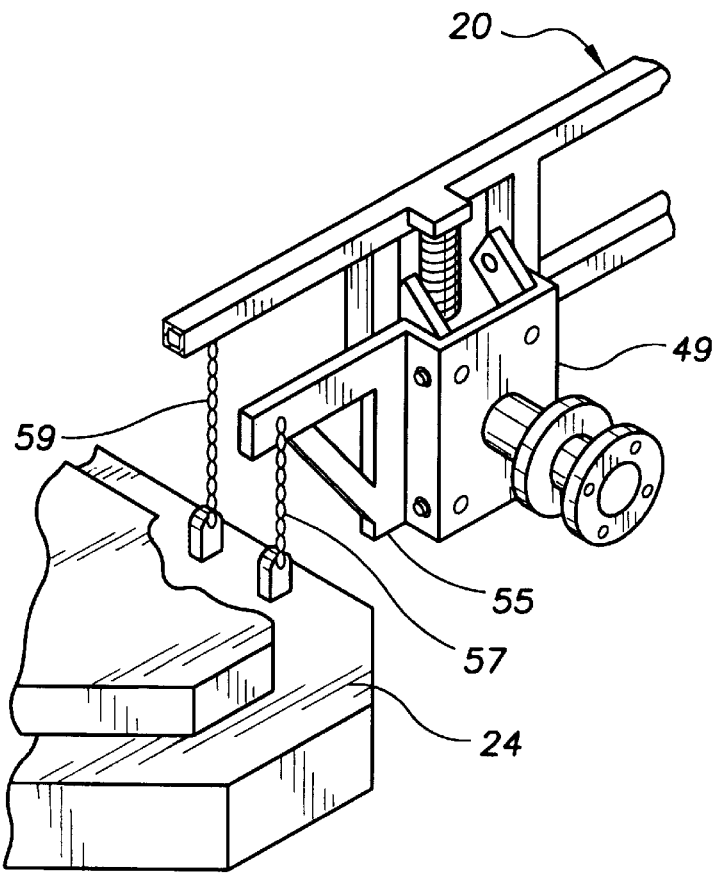
FIG. 13 is a partial view of a rear wheel assembly and suspension system, showing how the rear of the cutter deck is suspended from a bracket connected to the motor mount of the wheel assembly.

As described herein, the invention reduces the motion of the chassis of a mower, and consequent unwanted motion of the cutter deck, due to unevenness of the mowed surface. A still further improvement which has been discovered is to connect the motions of a sprung wheel assembly and the deck. In particular, as shown in FIG. 13, in one embodiment a floating cutter deck 24 is suspended from the chassis 20 by four hanger chains 59 (front and rear, each side; only one shown) and a lifting bracket 55 is attached to the motor mount 49 of each rear wheel. On each side, a lifting chain 57 runs from the bracket to the rear end of the deck 24. In another embodiment, there are only four chains: the two front chains run as just stated; the two rear most chains 59 run to the bracket 57. Thus, a portion of the deck moves upwardly when the rear wheel assembly adjacent the deck rises in response to a bump or rolling of the machine. The upper ends of the various hanger chains may be attached to devices, such as bell cranks, to enable adjustment and setting of the basic deck elevation, as are well known.

Figure 14:
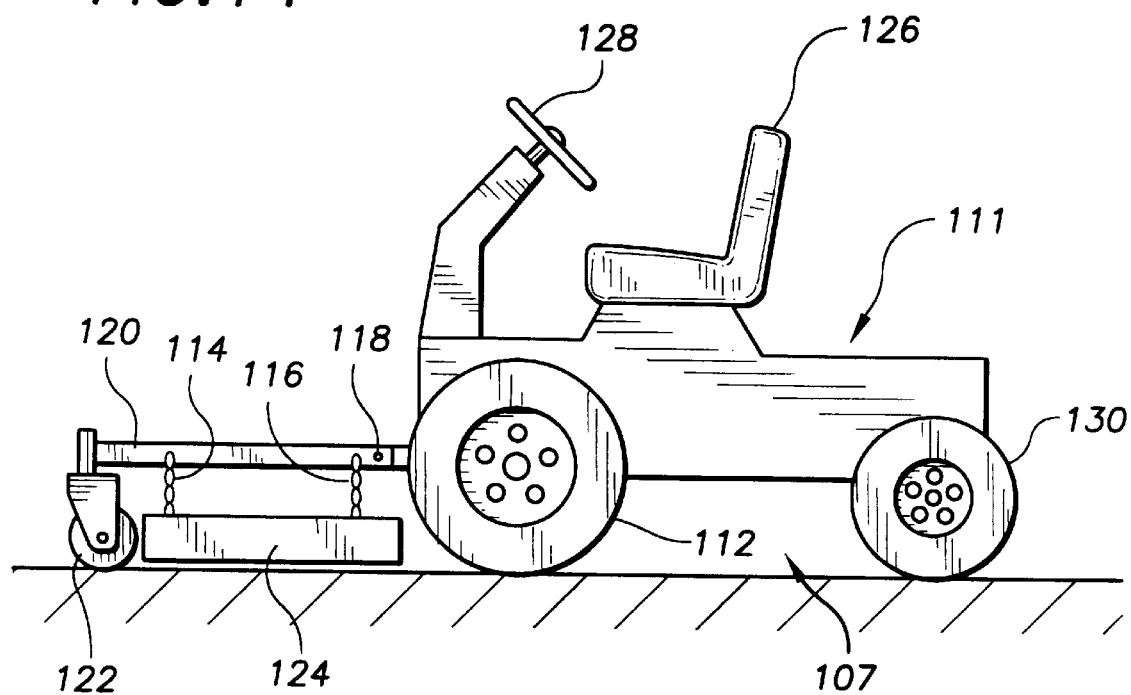
FIG. 14 shows a front wheel drive conventionally steered mower having a front-cantilever cutter deck.

FIG. 14 shows a front wheel drive, rear-wheel steered, mower 107 with a front-cantilever cutter deck 124. The chassis 111 (shown enclosed) contains the prime mover and other mechanisms. The operator sits on seat 126 and by means of steering wheel 128 turns the rear wheels 130 to control mower travel direction. The prime mover rotates the front drive wheels 112, typically through a transmission-differential type drive system. A deck frame 120 is pivotably cantilevered off the front of the chassis at pivot point 118. Caster wheels 122 support the front or cantilever end of the frame on the earth surface. The cutter deck 124 hangs by four chains 114, 116 from the frame 120, which four chains can be fitted with means for the operator to raise and lower the deck relative to the frame, to determine the basic cutting height of the deck. The rearmost chains 116 can be coupled to wheel motion as described for FIG. 13 just above, for chains 59. The drive wheels 112 are rotated by rotary shafts of the transmission system, rather than by independent motors. Each front wheel 112 is part of a wheel assembly, and each wheel assembly suspension system is comprised of a spring and equal length link assemblies, like those described for the rear drive wheels of mower 18.

Figure 15:
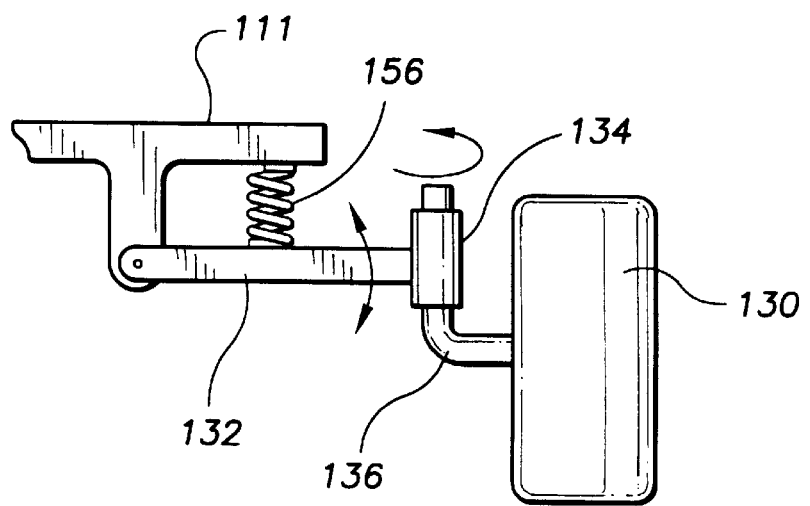
FIG. 15 shows a portion of the steerable rear wheel mechanism and suspension for the FIG. 14 mower.

Preferably, the rear steering wheels are also spring mounted. FIG. 15 Illustrates the essential elements of one of the two rear wheel systems of the FIG. 14 machine. Wheel 130 is mounted on a bearing at the end of bent swivel-pin 136 which is journaled in sleeve 134. The sleeve is welded to the outer end of pivoting stub axle 132. The stub axle pivots off the chassis 111 which is only schematically illustrated. For changing the travel direction of the wheel, the top of the swivel pin is rotated by unshown mechanisms which run to the steering wheel 128.

In some prior art lawn mowers, rear drive wheels are mounted on a rigid structure, e. g., an axle or transmission, that is pivotably mounted on the chassis. The action of such systems is like that of the pivotable front axle or subframe which has been described. Springs are sometimes employed to resist pivoting of such rear axles, to make them self-centering. While an improvement, such pivoted suspensions have limitations. Obviously, assuming solid earth, when one wheel rises—to whatever degree, the chassis must rise; and, when both wheels rise simultaneously (as when a mower traverse a wide bump), the effect is as if there was no spring—the chassis rises with the wheels. Depressions cause the opposite reactions. The reason for the inevitable chassis motion is that any vertical force due to motion of a wheel is transmitted to the chassis through the unresilient pivot at the center line of the machine. Furthermore, when a wheel on a pivoting axle moves vertically there is inherently both lateral or scuffing motion on the surface of the earth and change in camber of the wheel.

In comparison, with an independent suspension of the type described for the invention, there is no rigid mechanical connection between the motion of one wheel with that of an opposing wheel. If one wheel encounters a rise or depression, it will move against or with the spring force. This either results in a substantial decrease in chassis vertical motion, or even no appreciable motion, compared to chassis motions which occurs in older suspension systems. When both wheels rise or fall simultaneously due to a large bump or depression, there is no inherent vertical motion of the chassis, as there is with the pivotable axle or a fixedly mounted axle. Of course whether the chassis rises or falls in such an instance is a function of the size of the disturbance and the sprung and unsprung weights of the mower. Small irregularities rapidly traversed will tend to produce minimum chassis motion. In the independent suspension system comprising equal length links there is slight lateral wheel motion but no inherent change in camber, in contrast to a pivoting axle suspension and an unequal link length suspension. As said above, it is undesirable to have the wheel move in lateral directions where it contacts the earth surface, because such motion might damage the surface of a lawn; and, thus it is desirable to have a suspension which at least avoids change in camber, if some such motion must be tolerated. And, in general, change in camber changes the performance of a wheeled vehicle.

With the independent suspension invention, there is decrease in vertical motion of the chassis. Obviously, this is advantageous in lessening unwanted motion of the cutter deck which hangs from the chassis. As a result, evenness of grass cut is improved. When the mower travels over a bump which causes one drive wheel to move vertically up, the improved suspension system minimizes the effect on the other wheels. Thus, frictional contact with the surface is better maintained for the other drive wheel, and the front wheels. Similarly, when crossing a depression or coming off a bump, the spring urges the wheel downward faster than otherwise, and improves frictional contact. As mentioned above, this improved contact is particularly beneficial when a transmission steerable mower traverses a slope.

For types of mowers which have front drive wheels and unpowered rear wheels, the invention will be in general useful, as the FIG. 14 example shows. Thus, reference to front and rear parts of a mower should not be construed as limiting. Likewise, while the preferred mower has the cutter deck mounted between the front and rear wheels, the invention will also be applicable to mowers where the cutter deck is cantilever suspended from the chassis so that it is forward or rearward of the front or rear wheels, respectively.

The invention may also be applied to vehicles having more or fewer than four wheels. While the hydraulic drive system which has been described is preferred for a transmission steerable mower, the invention may also be used with primer mover and propulsion systems in which power is transmitted to the wheels mechanically, e.g., through drive shafts from a transaxle, or electrically.

It ought be understood that machines for mowing and working things other than lawns are encompassed by the invention. While the invention has been described in terms of a machine on which the operator rides, the invention may also be applied to machines designed so the operator can walk at the rear, or ride behind on a sulky, or otherwise guide the machine.

Although only the preferred embodiment has been described with some alternatives, it will be understood that further changes in form and detail may be made without departing from the spirit and scope of the claimed invention.

I claim:

1. A lawn mower, comprising:

a chassis having a front end and a rear end;

a prime mover mounted on the chassis;

a cutter deck supported from the chassis;

front wheels attached to the front end of the chassis;

two drive wheel assemblies on opposing sides of the rear end of the chassis, each drive wheel assembly connected to the chassis by at least one link pivotable with respect to the chassis and the drive wheel assembly;

a spring associated with each drive wheel assembly and positioned to bias the drive wheel assemblies in a downward direction;

wherein the drive wheels and front wheels support the chassis for movement over a surface;

each drive wheel assembly comprising a drive wheel rotated by means of the prime mover; and wherein each drive wheel assembly moves vertically up and down relative to the chassis, respectively against and with force exerted by the spring, independently of movement of the opposing drive wheel assembly.

2. The lawn mower as claimed in claim 1, wherein the cutter deck is suspended from the chassis between the front end and rear end of the chassis and wherein the cutter deck hangs at a predetermined distance from the chassis, the cutter deck movable upwardly under influence of an upward vertical force.

3. The lawn mower as claimed in claim 1, wherein each drive wheel assembly comprises a motor independently powered by the prime mover.

4. The lawn mower as claimed in claim 1, further comprising:

a transverse member attached to the front end of the chassis at a pivot point, the transverse member pivotable about a longitudinal centerline of the mower; the front wheels mounted at opposing ends of the transverse member, wherein the transverse member is a subframe pivotably attached to the chassis at two spaced apart pivot points.

5. A lawn mower, comprising:

a chassis having a front end and a rear end;

a prime mover mounted in the chassis;

a cutter deck supported from the chassis;

front wheels attached to the front end of the chassis;

two drive wheel assemblies on opposing sides of the rear end of the chassis, each drive wheel assembly connected to the chassis by an upper link and a lower link assembly vertically spaced apart therefrom; each link assembly pivotably connected at an inner end to a pivot point on the chassis and pivotably connected at an outer end to a pivot point on the wheel assembly;

a spring coupled to each drive wheel assembly;

wherein the drive wheels and front wheels support the chassis for movement over a surface;

each drive wheel assembly comprising a drive wheel rotated by means of the prime mover; and wherein each drive wheel assembly moves vertically up and down relative to the chassis, respectively against and with force exerted by the spring, independently of movement of the opposing drive wheel assembly.

6. The lawn mower as claimed in claim 5, wherein the distance between the inner and outer pivot points of the upper link assembly and of the lower link assembly is equal; each link assembly running parallel to the other.

7. The lawn mower as claimed in claim 5, wherein the distance between the points of pivotable connection of the upper link assembly is less than the corresponding distance for the lower link assembly.

8. The lawn mower as claimed in claim 1, wherein the spring is adjustable to different pre-compressions.

9. A lawn mower comprising;

a chassis having a front end, a rear end, and a longitudinal axis;

a subframe pivotably connected to the front end of the chassis for pivoting about the longitudinal axis and adapted to receive two front wheels;

a prime mover mounted on the chassis;

the two front wheels being attached to opposing sides of the subframe;

two drive wheel assemblies, one each on an opposing side of the rear end of the chassis and connected thereto by an upper link assembly and a lower link assembly, each link assembly comprising at least one link pivotably connected at an inner end to a pivot point on the, chassis and pivotably connected at an outer end to a pivot point on the wheel assembly, each drive wheel assembly comprising a wheel driven by the prime mover;

a cutter deck suspended beneath the chassis between the front and rear wheels by a deck hanger, the deck hanger holding the cutter deck beneath the chassis and limiting the downward movement of the deck to a predetermined distance while enabling the deck to move upwardly under the influence of an upward vertical force;

a spring pressing on each wheel assembly for urging the wheel assembly vertically down wherein each drive wheel assembly moves vertically up and down relative to the chassis, respectively against and with force exerted by the spring, independently of movement of the opposing wheel assembly.

10. The lawn mower as claimed in claim 9, wherein each drive wheel assembly further comprises a motor powered by the prime mover; and wherein variation of relative speed of the drive wheels of the two wheel assemblies alters the direction of travel of the lawn mower.

11. The lawn mower as claimed in claim 9, wherein the distance between the inner and outer pivot points of the one or more links of the upper link assembly are equal to the corresponding distance for the lower link assembly, whereby when a wheel assembly moves up or down there is no change in camber of the wheel of the assembly.

12. A lawn mower, comprising:

a chassis having a front end and a rear end;

a prime mover mounted on the chassis;

two drive wheel assemblies comprising drive wheels attached to the front end of the chassis on opposing sides thereof by respective springs, upper link assemblies, and lower link assemblies; wherein each link assembly comprises at least one link pivotably connected to the chassis and to a respective wheel assembly; wherein each drive wheel assembly moves vertically up and down relative to the chassis, respectively against and with force exerted by the spring, independently of movement of the opposing wheel assembly;

two steerable wheels attached to the rear end of the chassis on opposing sides thereof;

wherein the drive wheels and steerable wheels support the chassis for movement over a surface; and a cutter deck cantilevered from the front end of the chassis.

13. The lawn mower as claimed in claim 12, wherein each steerable wheel moves vertically up and down relative to the chassis, respectively against and with force exerted by a spring, independently of movement of the opposing steerable wheel.

14. A lawn mower, comprising:

a chassis;

a prime mover mounted on the chassis;

a cutter deck supported from the chassis;

two pairs of wheels, one each attached to the chassis at opposing ends thereof;

wherein:
  the wheels support the chassis for movement over a lawn surface,
  one of the pairs of wheels comprises drive wheels rotated by the prime mover; and
  each of the one pair of drive wheels is attached to the chassis by upper and lower link assemblies pivotably connected to the chassis and the drive wheel; and
  each drive wheel moves vertically up and down relative to the chassis, respectively against and with force transmitted to the wheel by a spring, independently of movement of the other wheel of the pair.

15. The lawn mower as claimed in claim 14, wherein each drive wheel is independently rotated by the prime mover; and wherein change in relative rotational speed of the drive wheels alters the direction of travel of the lawn mower.

16. The lawn mower as claimed in claim 15, wherein the upper and lower link assemblies cause each drive wheel to move vertically up and down without change in camber.

17. The lawn mower of as claimed in claim 14, wherein the cutter deck is suspended from the chassis, whereby the cutter deck is movable in an upward direction relative to the chassis when an upward force is applied to the deck portion; the lawn mower further comprising a lifting bracket coupled to the cutter deck for lifting the deck portion upwardly when a drive wheel moves upwardly.

18. A lawn mower, comprising:

a chassis having a front end and a rear end;

a prime mover mounted on the chassis;

a cutter deck supported from the chassis;

front wheels attached to the front end of the chassis;

two drive wheel assemblies on opposing sides of the rear end of the chassis, each connected to the chassis by suspension means comprising a spring;

wherein the drive wheels and front wheels support the chassis for movement over a surface;

each drive wheel assembly comprising a drive wheel rotated by the prime mover; and wherein each drive wheel assembly moves vertically up and down relative to the chassis, respectively against and with force exerted by the spring, independently of movement of the opposing drive wheel assembly; and wherein a roll center of the lawn mower substantially coincides in elevation with a center of gravity of the lawn mower.

* * * * *